United States Patent
Barbiero

(10) Patent No.: US 9,163,614 B2
(45) Date of Patent: Oct. 20, 2015

(54) STATIC WEIGHT ENERGY PRODUCTION APPARATUS

(71) Applicant: Cosimo Barbiero, Bridgewater, NJ (US)

(72) Inventor: Cosimo Barbiero, Bridgewater, NJ (US)

( * ) Notice: Subject to any disclaimer, the term of this patent is extended or adjusted under 35 U.S.C. 154(b) by 0 days.

(21) Appl. No.: 14/230,159

(22) Filed: Mar. 31, 2014

(65) Prior Publication Data

US 2014/0299415 A1   Oct. 9, 2014

Related U.S. Application Data

(60) Provisional application No. 61/806,479, filed on Mar. 29, 2013.

(51) Int. Cl.
*F03G 1/08* (2006.01)
*F03G 1/00* (2006.01)
*F03G 3/00* (2006.01)

(52) U.S. Cl.
CPC ... *F03G 1/00* (2013.01); *F03G 3/00* (2013.01)

(58) Field of Classification Search
CPC .......... F03G 1/08; F03G 2730/03; F03G 3/06
USPC ...................... 185/9, 10, 37, 38, 39; 290/1 E
See application file for complete search history.

(56) References Cited

U.S. PATENT DOCUMENTS

| | | | |
|---|---|---|---|
| 4,018,070 A | 4/1977 | Yagusic et al. | |
| 7,408,266 B2 * | 8/2008 | Yeh ................................ | 290/1 C |
| 8,471,395 B2 | 6/2013 | Kennedy | |
| 8,497,589 B2 | 7/2013 | Geletka | |
| 8,497,590 B2 | 7/2013 | Williams | |
| 2006/0219484 A1 * | 10/2006 | Ogura ............................. | 185/39 |
| 2010/0117374 A1 | 5/2010 | Geletka | |
| 2012/0312106 A1 * | 12/2012 | Sie et al. ........................... | 74/29 |

* cited by examiner

*Primary Examiner* — Phillip A Johnson
(74) *Attorney, Agent, or Firm* — Patterson Intellectual Property Law, P.C.; Jerry Turner Sewell

(57) ABSTRACT

An energy production apparatus that includes a weight bearing member configured to alternate between an upper and lower position, and a drive shaft. A gear system can be connected to the weight bearing member and the drive shaft. The gear system can be positioned to rotate the drive shaft when a load is placed on the weight bearing member and the weight bearing member moves from the upper position to the lower position. A torsion spring can be connected to the drive shaft, the torsion spring positioned to wind as the weight bearing member moves to the lower position. A return member can be configured to return the weight bearing member to the upper position. A locking member can selectively engage the gear system, the locking member preventing the torsion spring from unwinding when engaged. A generator can be driven by the drive shaft as the torsion spring unwinds.

19 Claims, 11 Drawing Sheets

STATIC WEIGHT ENERGY PRODUCTION APPARATUS

CROSS-REFERENCES TO RELATED APPLICATIONS

This application claims benefit of the following patent application(s) which is/are hereby incorporated by reference: Ramp Generator, Ser. No. 61/806,479, filed Mar. 29, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a static weight energy production apparatus that converts the static weight of a load into rotational motion that can be used for mechanical power or to power a generator. Such systems are beneficial for environmental reasons as they use gravity as the source of energy to produce power, as opposed to conventional combustible fuels which are significantly more harmful to the environment.

More particularly, this invention pertains to an energy production apparatus that can uses the weight of heavier objects including but not limited to vehicles to produce energy. The prior art includes highway energy production systems that produce electrical energy as cars travel over a small ramp on the highway. However, the downward gravitational force of a passing car is minimal as the majority of the force of a traveling car is exerted in a forward direction. Thus these systems do not capture the significant gravitational potential energy of larger objects such cars or other vehicles. Additionally, these systems depend on cars continually passing over the ramp system to produce a continuous energy supply.

Other energy producing systems have harnessed the static weight of a load to produce energy. These systems include generators that are run as an object on a platform moves downward. These systems however, can only produce energy as the load is moving downward. There is significant energy loss that occurs during the start-up and slow-down of the generators each time a load is placed on the system and subsequently removed, where the generator is turning and consuming energy, but is not turning fast enough to produce electrical power. Thus, such systems are inefficient and unsatisfactory.

What is needed, then, are improvements in static weight energy production systems.

BRIEF SUMMARY OF THE INVENTION

The present invention relates generally to an energy production apparatus that can convert the static weight of heavy loads into mechanical or electrical energy.

One aspect of the present invention is an energy production apparatus having a weight bearing member that can alternate between an upper and lower position. The apparatus includes a drive shaft and a gear system. The gear system can be connected to the drive shaft and the weight bearing member. The gear system is positioned to rotate the drive shaft as a load is placed on the weight bearing member and the weight bearing member moves from the upper position to the lower position. A torsion spring can be connected to the drive shaft. The torsion spring can be positioned to wind as the weight bearing member moves from the upper position to the lower position. A return member can be configured to return the weight bearing member to the upper position once the load is removed from the weight bearing member. A locking member can selectively engage the gear system. The locking member can prevent the torsion spring from unwinding when the locking member is engaged with the gear system. In some embodiments, the locking member includes a pawl and ratchet system, such that when the pawl is engaged with the gear system, the gear system can be free to rotate in order to wind the torsion spring, but the gear system can be prevented from rotating in the opposite direction, thereby preventing the torsion spring from unwinding.

The benefit of such a system is that potential energy can be stored in the torsion spring as it winds. The potential energy is not immediately released once the load is removed from the weight bearing member. The locking member can retain the potential energy in the torsion spring until the operator chooses to disengage the locking member. As such, multiple loads can be placed on the weight bearing member in sequence, which can continually increase the potential energy stored in the torsion spring. When the operator chooses to release the locking member and the torsion spring is free to unwind, the system can then utilize a larger source of potential energy, which can be converted to mechanical rotational energy which can be used for mechanical power or to produce electrical power via a generator. The larger potential energy stored in the torsion spring can be used to increase the instantaneous power output from the system, or can be used to extend the time that the generator can run. The energy production apparatus also reduces the energy loss associated with the startup and slow down of a generator, which can make the apparatus more efficient than conventional solutions.

Another aspect of the present invention is an energy producing apparatus including a weight bearing member, a drive shaft, and a gear system. The weight bearing member can alternate between an upper position and a lower position. The gear system can be connected to the weight bearing member and the drive shaft such that the drive shaft is rotated by the gear system when the weight bearing member moves from the upper position to the lower position. A torsion spring can be disposed on the drive shaft. The torsion spring winds as the weight bearing member moves to the lower position. The apparatus can further include a generator coupled to the drive shaft, the generator driven by the shaft when the torsion spring unwinds.

One objective of the present invention is to provide an efficient energy production apparatus.

Another objective of the present invention is to provide an environmentally clean energy production apparatus.

Another objective of the present invention is to provide an apparatus that can produce energy for an extended period of time.

Another objective of the present invention is to utilize the static weight gravitational potential energy of heavy loads to produce mechanical or electrical energy.

DETAILED DESCRIPTION OF THE INVENTION

While the making and using of various embodiments of the present invention are discussed in detail below, it should be appreciated that the present invention provides many applicable inventive concepts that is embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The term "lateral" denotes a side to side direction when facing the "front" of an object.

The present invention relates generally to an energy production apparatus 10 that can convert the static weight of a heavy object including, but not limited to, a vehicle such as a car, truck or forklift into rotational motion which can then be used to produce mechanical or electrical energy.

Figure 1:
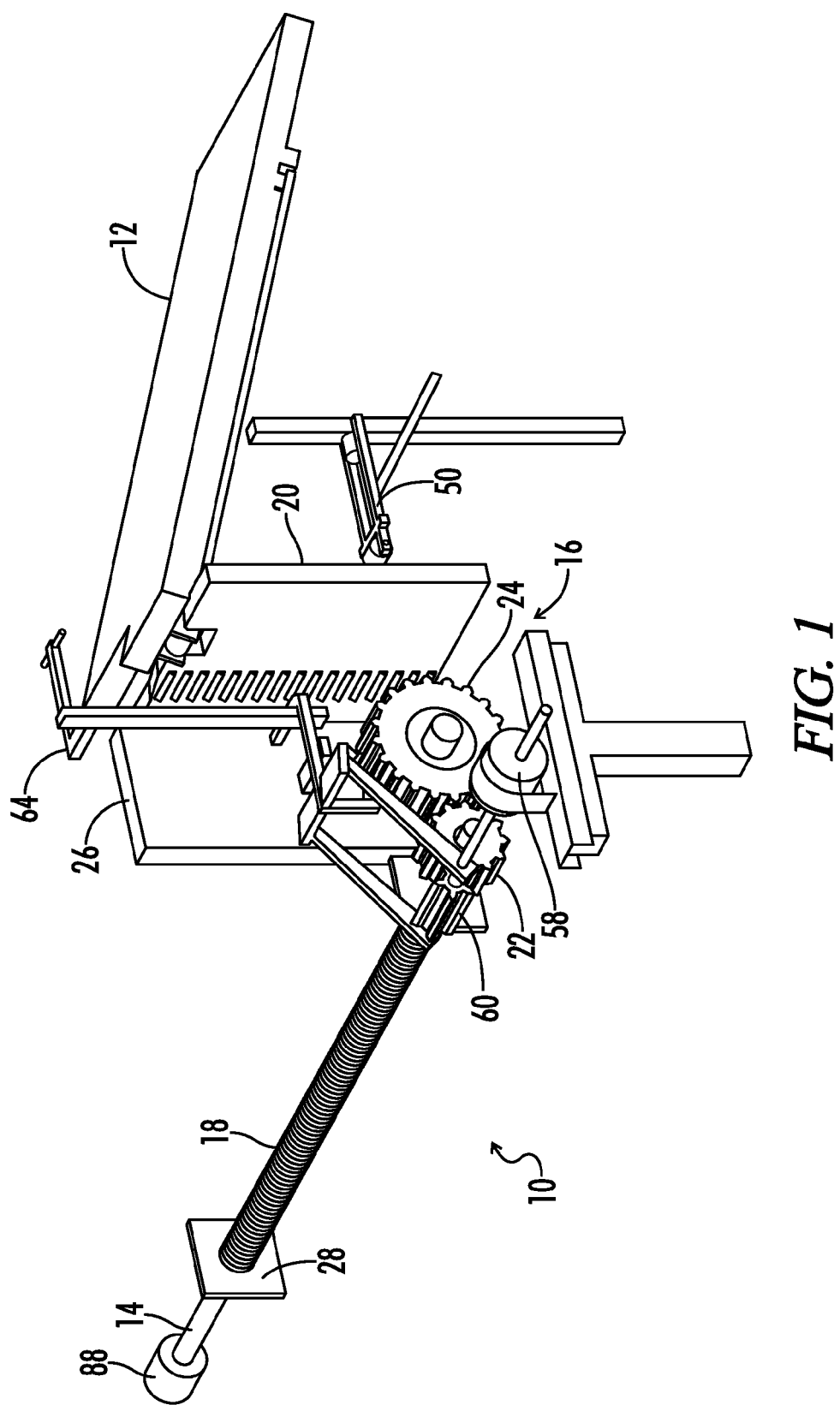
FIG. 1 is a perspective view of one embodiment of an energy production apparatus of the present invention.

A first embodiment of an energy production apparatus 10 is shown in FIG. 1. The apparatus includes a weight bearing member 12. The weight bearing member 12 can alternate between an upper position and a lower position. The apparatus can also include a drive shaft 14 and a gear system 16. The gear system 16 can be connected to the weight bearing member 12 and the drive shaft 14 such that the gear system 16 is positioned to rotate the drive shaft 14 when a load is placed on the weight bearing member 12 and the weight bearing member 12 moves from the upper position to the lower position. A torsion spring 18 can be connected to the drive shaft 14 and positioned to wind as the weight bearing member 12 moves to the lower position and the drive shaft 14 rotates.

The gear system 16 can include any suitable gear system that can cause the drive shaft 14 to rotate as the weight bearing member 12 moves to the lower position. The gear system can be an overdrive system that can help increase the number of revolutions that the drive shaft makes as the weight bearing member 12 moves to the lower position which can help increase the amount of winding on the torsion spring 18 and help increase the amount of potential energy produced in the torsion spring 18. The gear system 16 can include a combination of multiple gears, or the gear system can be in the form of a gear box.

In FIG. 1, the gear system 16 includes a linear gear 20 connected to the weight bearing member 12, a secondary gear 22 on the drive shaft 14, and an idler gear 24 meshed with the linear gear 20 and the secondary gear 22. As the weight bearing member 12 moves to the lower position, the linear gear 20 moves in a downward direction rotating the idler gear 24, which in turn rotates the secondary gear 22. As such, the secondary gear 22 on the drive shaft 14 is driven by the linear gear 20 via the idler gear 24. The idler gear 24 in some embodiments can be connected to a support structure 26 such that the idler gear 24 can rotate freely. The idler gear can help alleviate the force on the drive shaft 14 associated with a large load that is placed on the weight bearing member 12, as the force from the load can be transferred to the drive shaft 14 as the weight bearing member 12 moves to the lower position. In some embodiments, the secondary gear 22 can be directly driven by the linear gear 20 without the use of an idler gear 24.

In some embodiments, the gear ratio between the idler gear 24 and the secondary gear 22 is at least two to one. As such, the secondary gear 22 will have more revolutions than the idler gear 24, which can increase the amount the torsion spring is wound per load that is placed on the energy producing apparatus 10, thereby increasing the amount of potential energy stored in the torsions spring 18. In some embodiments, the gear ratio between the idler gear 24 and the secondary gear 22 is at least 3 to 1.

Figure 2:
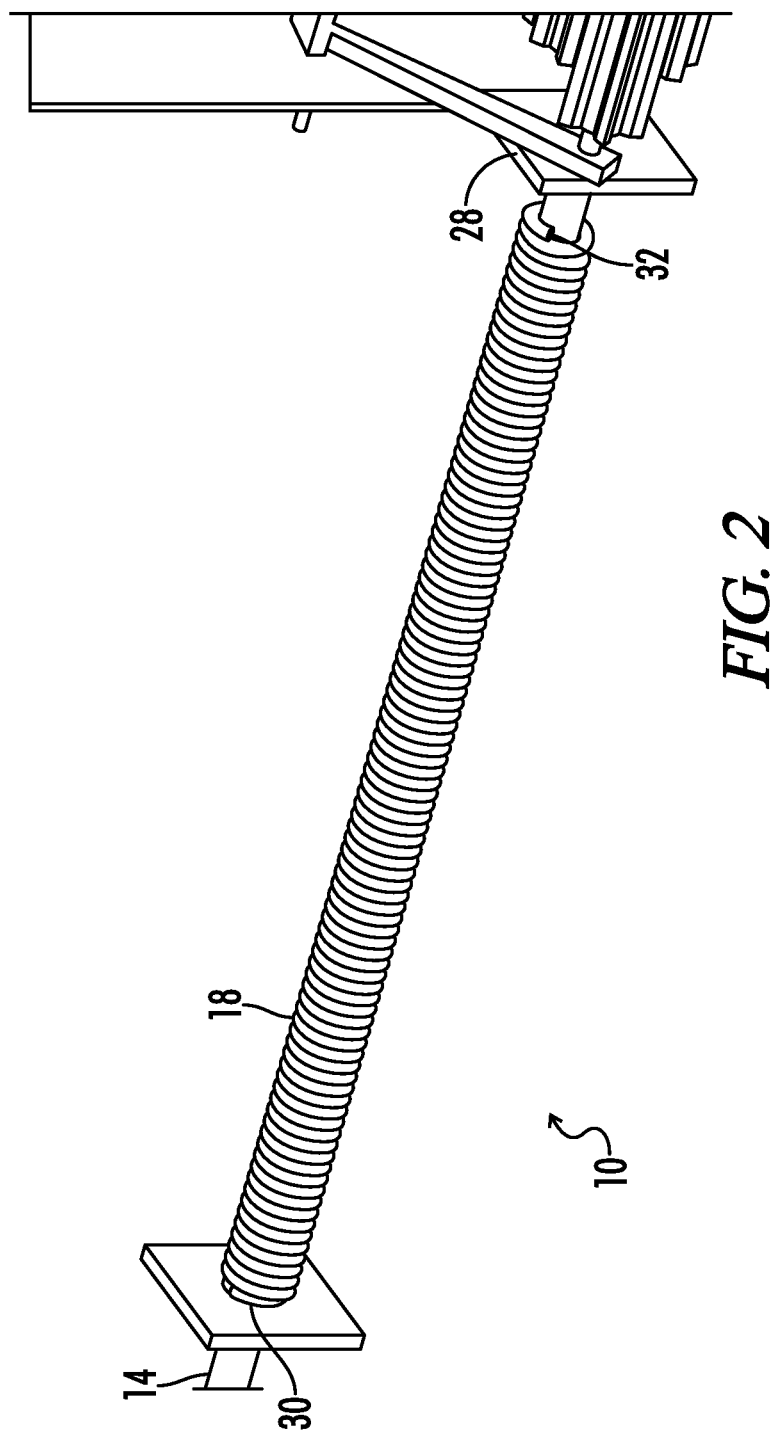
FIG. 2 is a detailed view of the drive shaft and torsion spring of the energy production apparatus of FIG. 1.

Referring now to FIG. 2, the apparatus 10 can also include one or more fixed support plates 28. The drive shaft 14 can rotate freely on the fixed support plates 28. The torsion spring 18 can include a first end 30 and a second end 32. The first end 30 of the torsion spring 18 can be connected to the fixed support plate 28, and the second end 32 of the torsion spring 18 can be fixed to the drive shaft 14. As such, when the drive shaft rotates, the first end 30 of the torsion spring 18 is stationary on the fixed support plate 28 while the second end 32 of the torsion spring 18 rotates on the drive shaft 14, effectively winding the torsion spring 18. Once the torsion spring 18 is wound, the torsion spring may be inclined to unwind to its natural position, and can thereby rotate the drive shaft 14 in the opposite direction.

Figure 3:
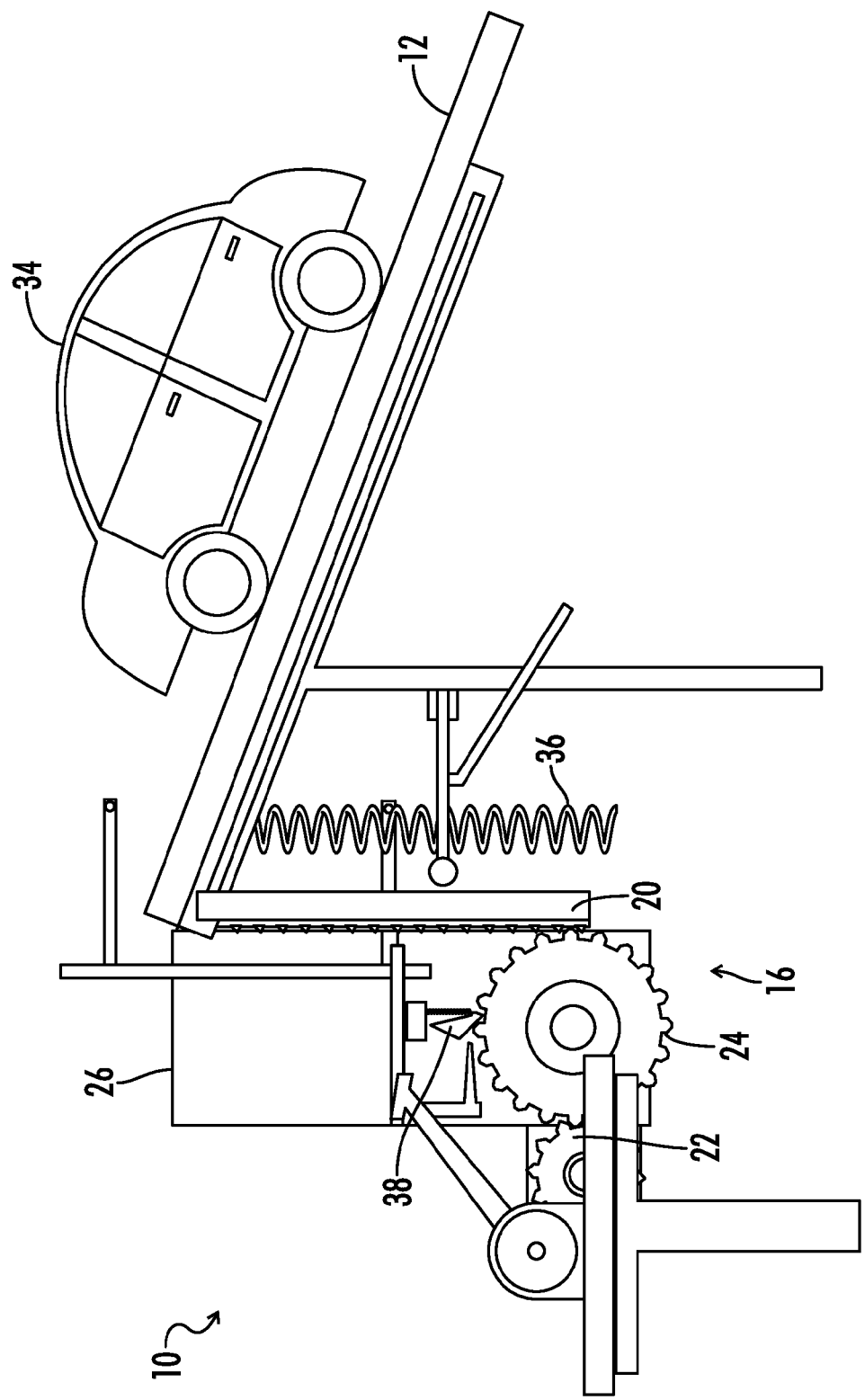
FIG. 3 is a side view of the energy production apparatus of FIG. 1.

Referring now to FIG. 3, weight bearing member 12 in some embodiments can be a ramp. The ramp 12 can have a substantially inclined orientation when the ramp 12 is in the upper position. The ramp 12 is shown in FIG. 3 in the upper position. When a load 34 is placed on the ramp 12, the ramp 12 can rotate to a lower position such that the ramp 12 has a substantially flat orientation. Having a weight bearing member 12 that is a ramp can allow larger loads to be rolled onto the weight bearing member 12 as opposed to being lifted onto the weight bearing member 12. In other embodiments, the weight bearing member 12 can be a platform on which a load can be placed. In such embodiments that include a platform, a ramp can also be provided such that items can be rolled up the ramp and onto the platform.

The apparatus 10 can also include supports or braces generally known in the art that can be connected to the weight bearing member 12. The supports can allow the weight bearing member 12 to move back and forth between the upper position and the lower position while providing support for the load on the weight bearing member 12. The supports in some embodiments can include a locking mechanism that can lock the weight bearing member 12 in either the upper position or the lower position, or both, such that an operator can control when to activate the energy production apparatus. Additionally, the supports can limit the range of motion of the weight bearing member 12.

The load 34 placed on the weight bearing member 12 in FIG. 3 is a car. The load 34 can be any suitable object which can provide potential energy in the form of gravitational potential energy, including but not limited to cars, trucks, forklifts, building materials, warehouse product, etc. The energy production apparatus 10 can be implemented for applications where these loads are meant to be stationary, such as, but not limited to, parking garages, parking lots, or industrial warehouse settings where such loads can be stored.

The energy production apparatus can also include a return member 36 which can raise the weight bearing member 12 back to the upper position once the load 34 has been removed. The return member 36 in FIG. 3 is a spring which biases the weight bearing member 12 in the upper position. In other embodiments, the return member can be a hydraulic or pneumatic system that can be activated to raise the weight bearing member 12 to the upper position.

The energy production apparatus 10 can also include a locking member 38 which selectively engages the gear system 16 such that the torsion spring 18 is prevented from unwinding when the locking member 38 is engaged. In other embodiments, the locking member can selectively engage the drive shaft 14 such that the torsion spring 18 can be prevented from unwinding. The locking member 38 in FIG. 3 can selectively engage the idler gear 24. In some embodiments, the locking member 38 can selectively engage the secondary gear 22.

Figure 4:
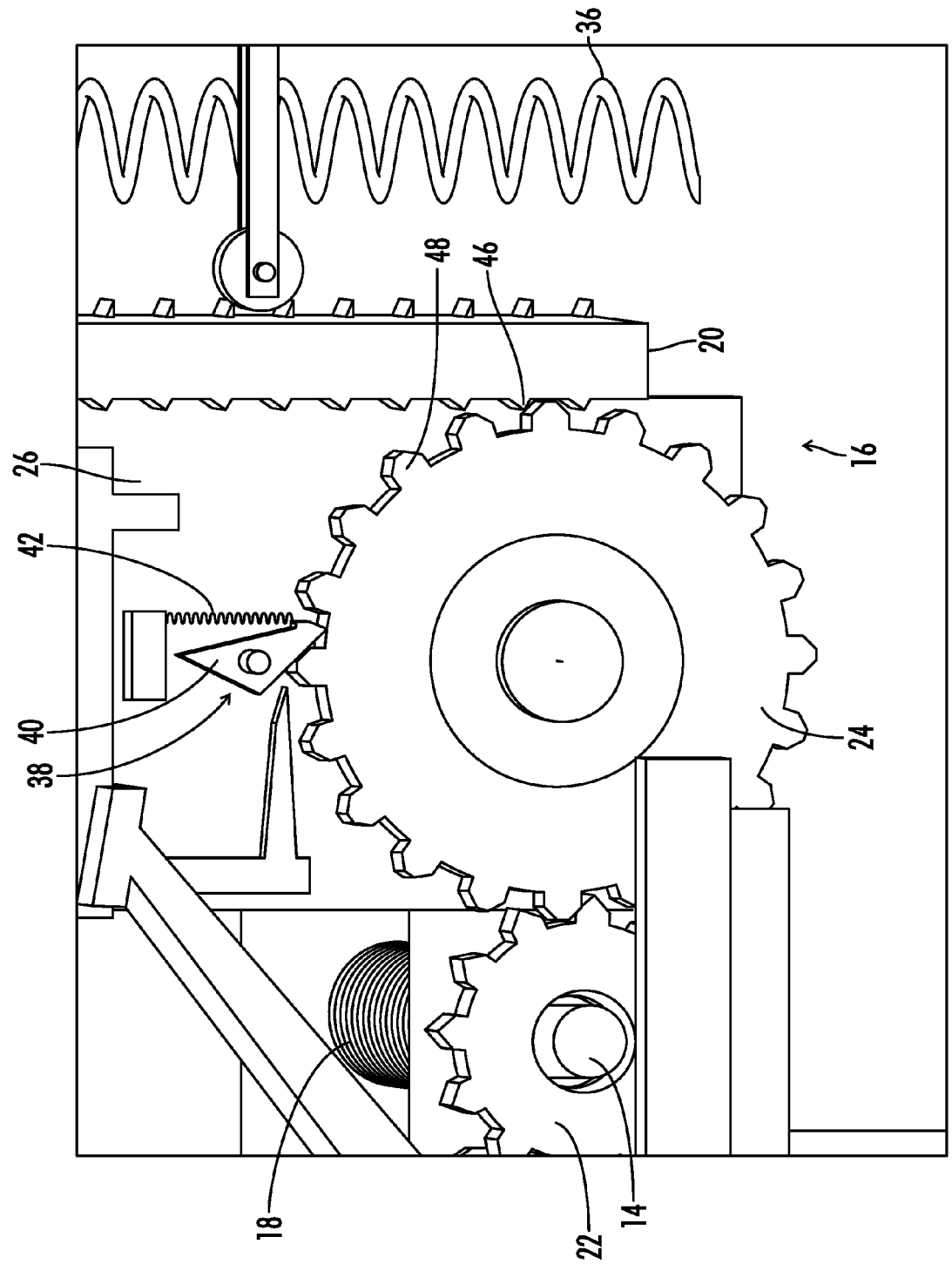
FIG. 4 is a detailed view of the locking member of the energy production apparatus of FIG. 1 when the locking member is in an engaged position with the gear system.

Referring now to FIG. 4, the locking member 38 is shown in an engaged position with the gear system 16. When engaged with the gear system 16, the locking member 38 can prevent the gear system 36 from rotating as the torsion spring 18 tries to unwind. Thus, once the torsion spring 18 is wound, the locking member 18 can prevent the torsion spring 18 from unwinding. The locking member 18 can additionally be any suitable mechanical means for stopping the angular rotation of the gear system 16 such that the torsion spring 18 can be prevented from unwinding until an operator chooses. In some embodiments, the locking member 18 can rotate to engage the gear system 16. In other embodiments, the locking member 38 can slide to engage the gear system 18.

The locking member 38 in FIG. 4 is a pawl and ratchet system. The pawl 40 is biased by a pawl spring 42 such that the pawl 40 engages the idler gear 24. The pawl 40 and the pawl spring 42 can be connected to the support structure 26.

The pawl 40 can have a distal end 44 that engages the idler gear 24. The distal end 44 can be oriented such that when the weight bearing member 12 moves to the lower position, the linear gear 20 moves downward and turns the idler gear 24 in a first direction driving the secondary gear 22 and the drive shaft 24, effectively winding the torsion spring 18. As the idler gear 24 moves in the first direction, the teeth on the idler gear push the pawl in an upward direction and compress the pawl spring 42. As the teeth clear the pawl 40, the pawl spring 42 forces the pawl 40 back into an engaged position. As such, the locking member 38 can include a ratcheting system that allows the gear system 16 to rotate and wind the torsion spring 18.

When the weight bearing member 12 reaches the lower position and the torsion spring 18 is wound, the torsion spring 18 will be biased such that the torsion spring 18 can force the drive shaft 14 and the gear system 16 to rotate in the opposite direction. However, the pawl 40 can be oriented such that the pawl 40 will prevent the idler gear 24, and thereby the entire gear system 16, from rotating in the opposite direction. This effectively keeps the torsion spring 18 wound.

In some embodiments the linear gear 20 can be hingedly connected to the weight bearing member 12, as shown in FIG. 1. Referring again to FIG. 4, the linear gear 20 can have teeth 46 that engage the teeth 48 on the idler gear 24, the teeth 46 on the linear gear 20 being angled in a downward direction such that they engage the teeth 48 on the idler gear 24 when a load is placed on the weight bearing member 12 and the linear gear 20 moves in a downward direction. When the load is removed, and the return member 36 raises the weight bearing member 12 to the upper position, the top surface of the teeth 46 on the linear gear 20 being an angled surface, slide over the teeth 48 of the idler gear 24, forcing the linear gear 20 to pivot away from and clear the idler gear 24. As such, the weight bearing member 12 and the linear gear 20 can be raised while the idler gear 24 remains stationary and the torsion spring 18 remains wound.

In some embodiments, the weight of the linear gear 20 may be sufficient to bias the linear gear 20 in a generally vertical position such that the teeth 46 on the linear gear can engage the teeth 48 on the idler gear 24. As the linear gear 20 moves upward, the angled teeth 46 pivot the linear gear 20 away from the idler gear 24. Once the teeth 46 on the linear gear 20 clear the teeth 48 on the idler gear 24, the force of gravity returns the linear gear 20 to an engaged position with the idler gear 24.

Figure 5:
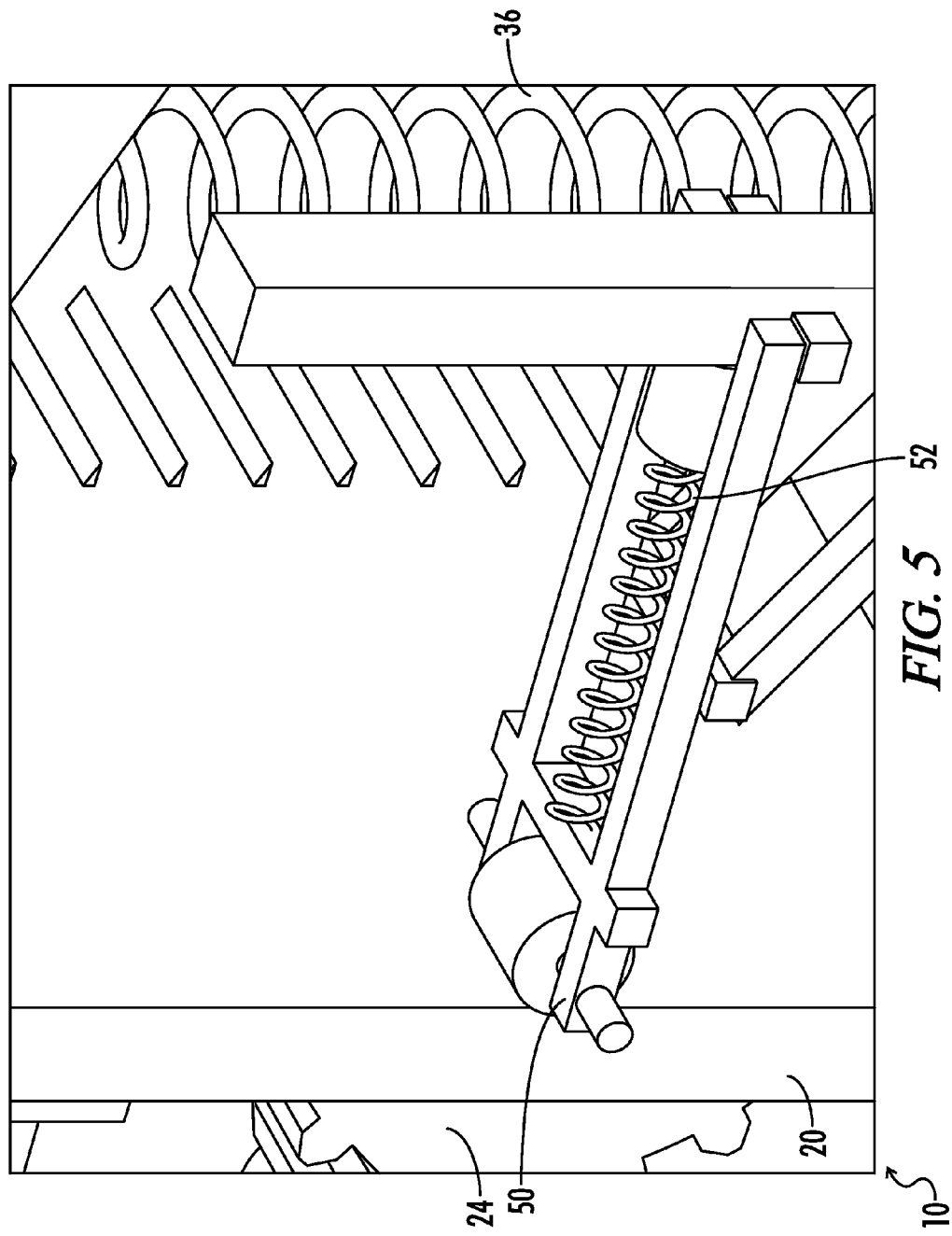
FIG. 5 is a detailed view of a roller assembly of the energy production apparatus of FIG. 1.

In other embodiments, as shown in FIG. 4 and FIG. 5, the linear gear 20 can be biased in an engaged position with the idler gear 24 by a roller assembly 50 positioned behind the linear gear 20. The roller assembly 50 can include a roller spring 52 that biases the roller assembly against the linear gear 20, and thereby biases the linear gear 20 to engage the idler gear 24. As the linear gear moves upward, the angled teeth 46 force the linear gear 20 against the roller which compresses roller spring 52. Once the angled teeth 46 on the linear gear 20 clear the teeth 48 on the idler gear, the roller spring 52 forces the idler gear 20 back to an engaged position with the idler gear 24. The roller assembly 50 can provide substantially frictionless contact with the linear gear 20 such that the linear gear 20 can be forced toward the idler gear 20 without interfering with the vertical movement of the linear gear 20 during the operation of the energy production apparatus 10.

Figure 6:
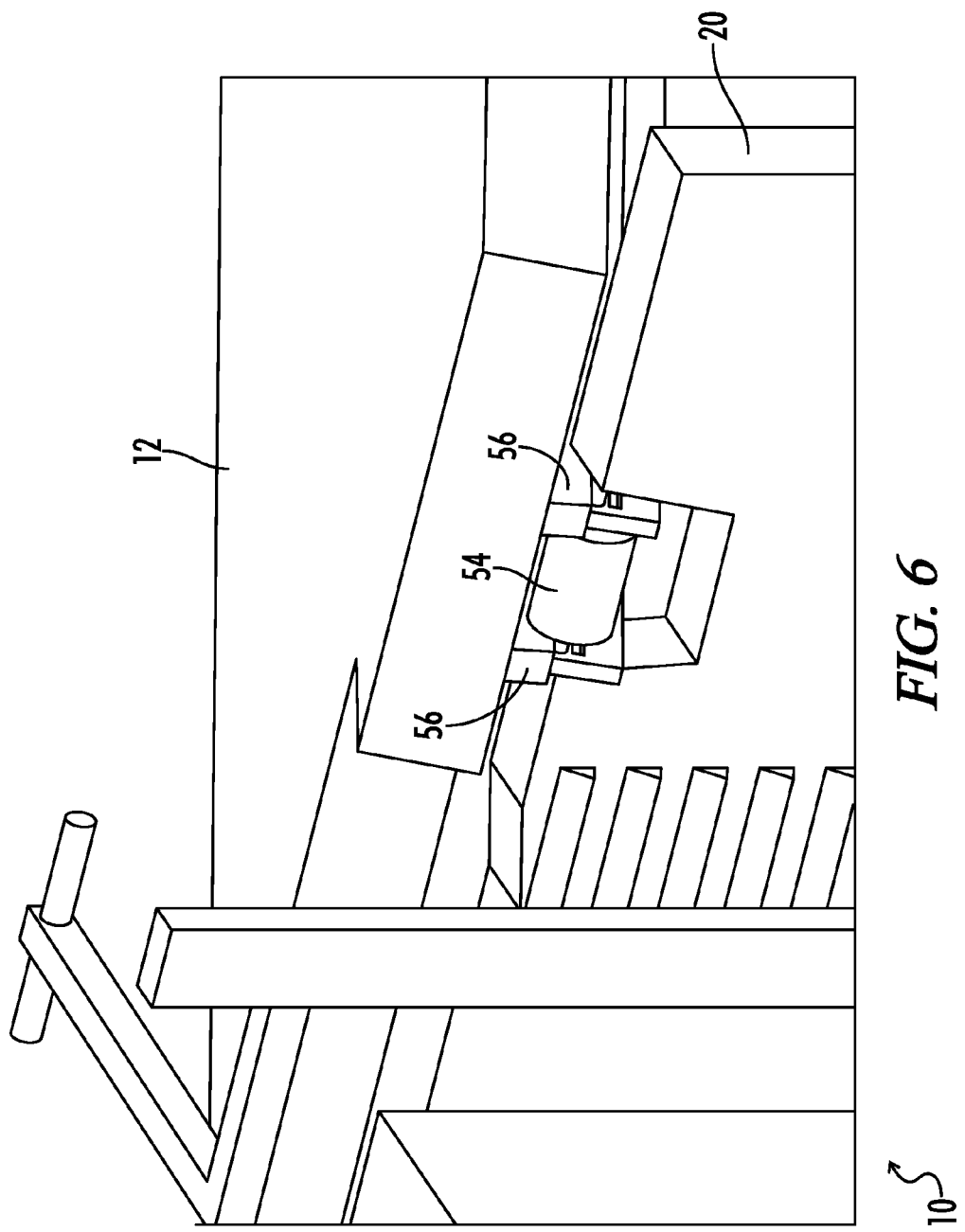
FIG. 6 is a detailed perspective view of the linear gear guide rail of the energy production apparatus of FIG. 1.

In some embodiments, as seen in FIG. 6, the linear gear 30 can include a translational roller 54. The weight bearing member 12 can include a guide rail 56 on an underside of the weight bearing member 12. The translational roller 54 can be positioned within the guide rail 56. As such, when the weight bearing member 12 moves to the lower position, the translational roller 54 can move downward along the guide rail 56 so that the linear gear 20 remains in substantially the same horizontal position as the linear gear 20 moves downward and engages the idler gear 24. Such a mechanism can help provide consistent contact and engagement between the linear gear 20 and the idler gear 24 as the linear gear 20 moves downward. As the return member 36 returns the weight bearing member 12 to the upper position, the roller assembly 50 can force the linear gear 20 toward the idler gear 24 which can force the translational roller to move up the guide rail 56 back to its initial position. As such, the linear gear 20 can remain in substantially the same horizontal position as the weight bearing member 12 moves back and forth between the upper and lower positions.

Figure 8:
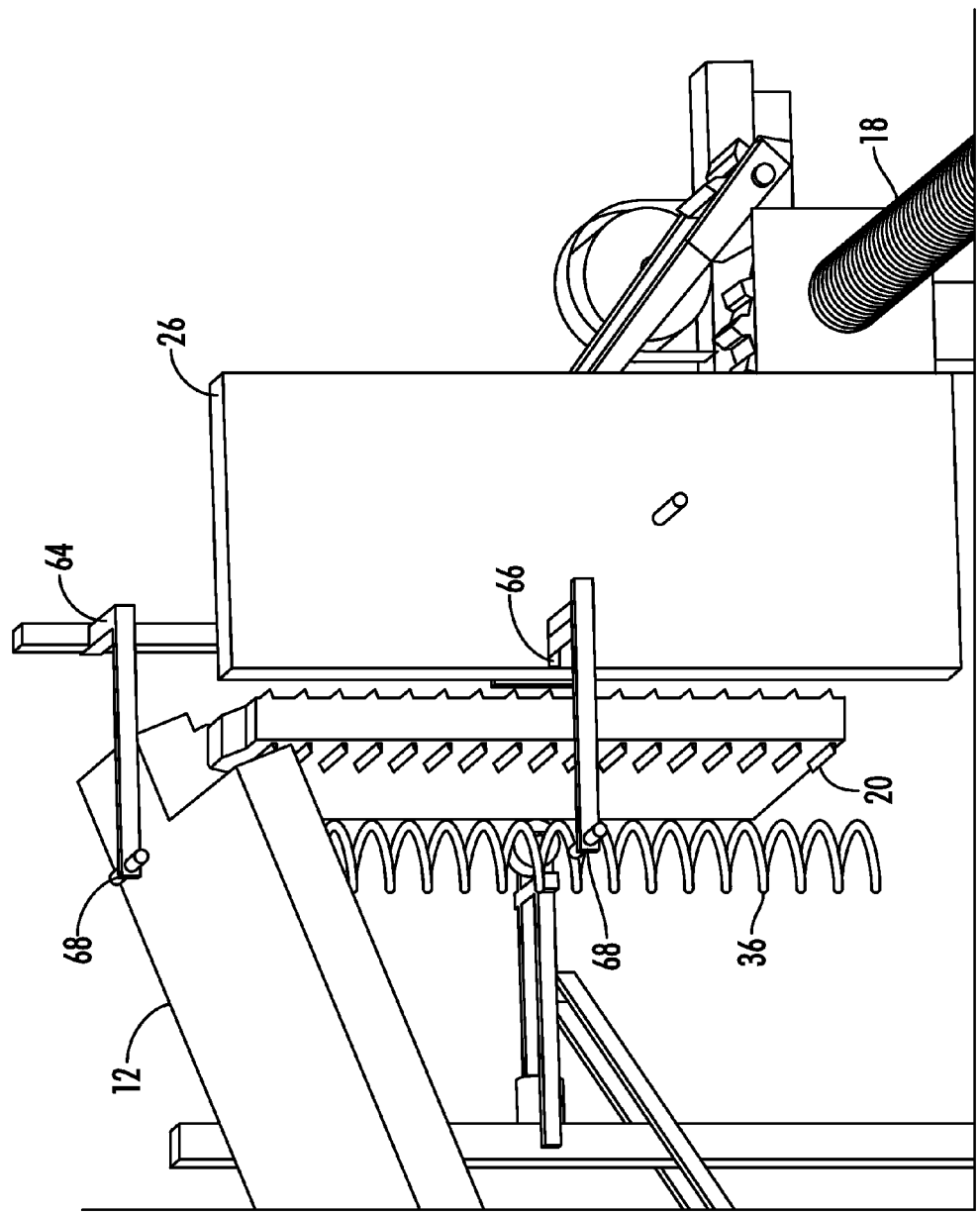
FIG. 8 is a partial back view of the energy production apparatus of FIG. 1.

Referring again to FIG. 1, in some embodiments the energy production apparatus 10 can also include a lever 64 that can selectively disengage the locking member 38 from the gear system 16. The lever 64 can be positioned in a slot 66 in the support structure 26, as shown in FIG. 8. The lever 64 can move back and forth within the slot 66. The lever 64 can have one or more handles 68 that an operator can use to move the lever and selectively disengage the locking member 38 from the gear system 16.

Figure 9:
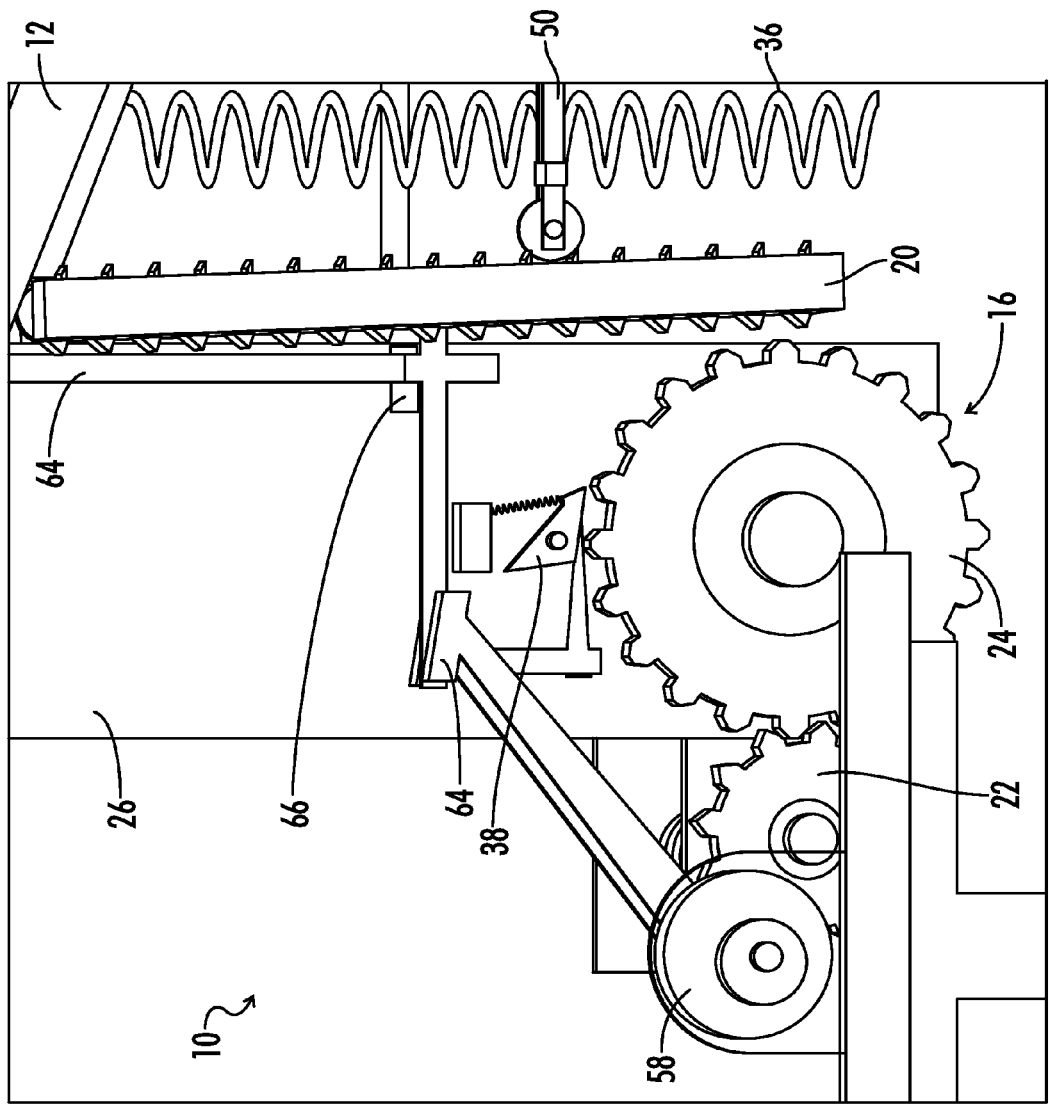
FIG. 9 is a detailed view of the locking member of the energy production apparatus from FIG. 1 when the locking member is in a disengaged position with the gear system.

Referring now to FIG. 9, when the handles 68 of the lever 64 are pulled by the operator, the lever 64 moves within the slot 66 in the support structure 26. The lever 64 can engage the locking member 38 such that the locking member 38 is forced upward and clears the teeth 48 on the idler gear 24. As such, the idler gear 24 would be free to rotate in either rotational direction. Thus when the torsion spring 18 is wound and the lever 64 is activated to disengage the locking member 38 from the gear system 16, the torsion spring 18 is free to unwind and effectively rotate the drive shaft 14 and the gear system 16. The lever can also be configured to engage the linear gear 20 when the lever 64 is moved within the slot 66, which can force the linear gear 20 to pivot and disengage the idler gear 24 such that the linear gear 20 does not interfere with the rotation of the idler gear 24 as the torsion spring 18 unwinds.

The benefit of such a system is that multiple loads can be placed on the energy production apparatus 10 in sequence. After each load is removed from the weight bearing member 12, the locking member 38 can prevent the torsion spring 18 from unwinding such that the potential energy in the torsion spring 18 can be maintained. When the next load in sequence is placed on the weight bearing member 12, the torsion spring 18 is further wound and the potential energy stored in the torsion spring 18 increases. As such, when the lever 64 is finally activated and the locking member 38 is disengaged, the torsion spring 18 can release a larger amount of potential energy, which can increase the power produced from the energy producing apparatus 10, or can elongate the time that the energy producing apparatus 10 can continue producing power. Such an apparatus can remove the continual start-up and slow down time associated with conventional solutions, and thus is more efficient and produces more usable energy.

In some embodiments, the drive shaft 14 can be coupled to a machine or device that runs off of mechanical rotational energy, such that the energy producing apparatus 10 can operate as a motor.

In other embodiments, as shown in FIG. 1, the energy production apparatus 10 can include a generator 58 coupled to the drive shaft 14. The generator 58 in some embodiments can be connected directly to the drive shaft 14 such that the drive shaft 14 powers the generator 58 directly as the drive shaft 14 rotates. In other embodiments, as shown in FIG. 1, the apparatus 10 can include a generator gear 60 that is connected to the generator 58. The generator gear 60 can be meshed with the secondary gear 22 on the drive shaft 14, such that the secondary gear 22 and the generator gear 60 effectively power the generator 58 as the drive shaft 14 rotates.

Figure 7:
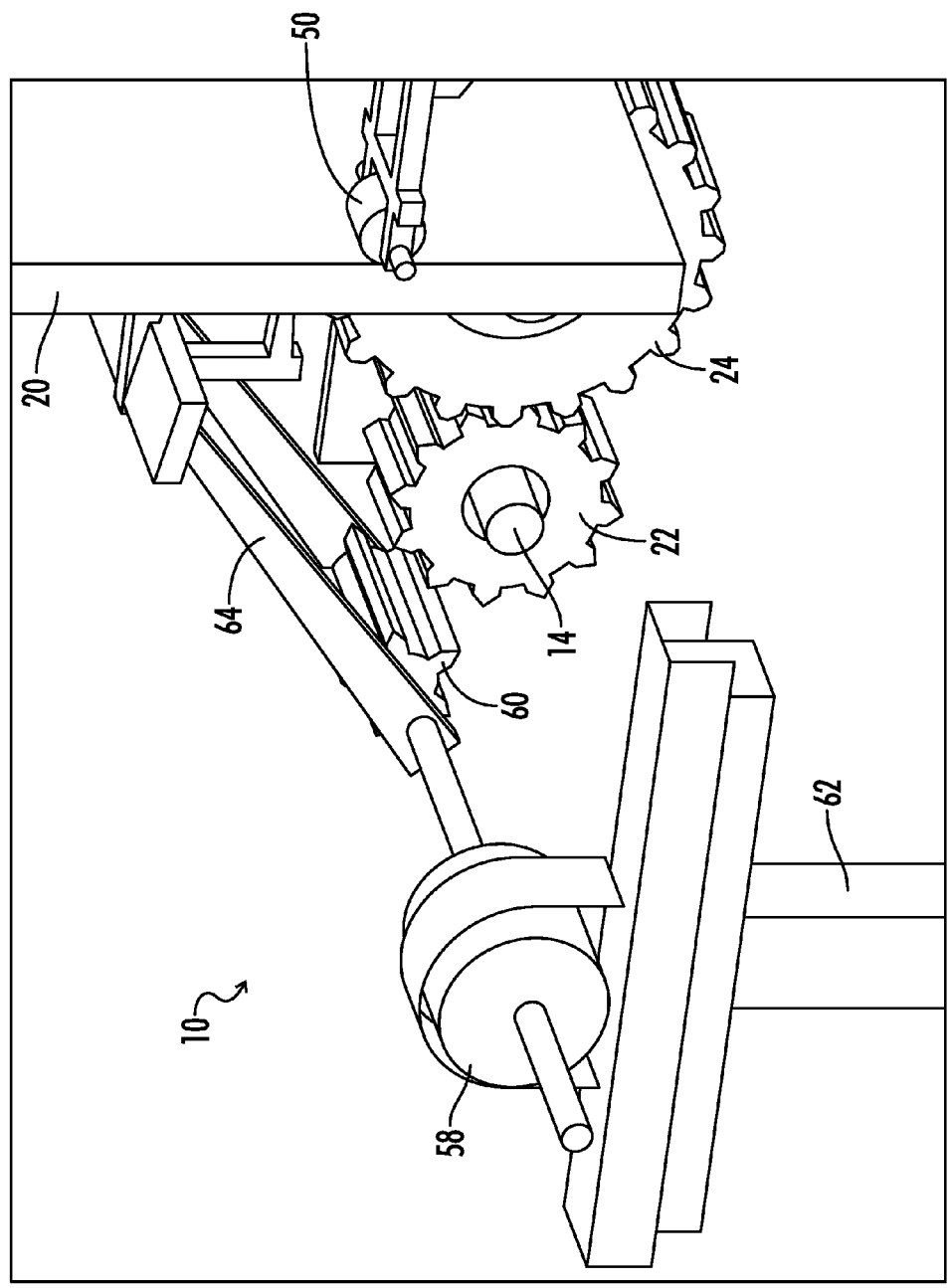
FIG. 7 is a detailed view of the generator of the energy production apparatus of FIG. 1 when the locking member is in an engaged position with the gear system.

In some embodiments, as shown in FIG. 7, the generator 58 and the generator gear 60 can be slidably mounted on a support tower 62 such that the generator gear 60 can selectively engage the secondary gear 22. For instance, in some embodiments the generator gear 60 can be configured to only engage the secondary gear 22 when the torsion spring 18 unwinds and not when the torsion spring 18 is winding, as shown in FIG. 7. In such an embodiment, the generator gear 60 and the generator 58 can be connected to the lever 64. When the lever is activated to disengage the locking member 38 from the gear system 16 and the torsion spring 18 is allowed to unwind, the generator gear 60 and the generator 58 can slide on the support tower 62 as the lever 64 moves so that the generator gear 60 engages the secondary gear 22 on the drive shaft 14. The lever 64 and the generator gear 60 are shown in a disengaged position in FIG. 7 when the locking member is engaged with the gear system 16 and the torsion spring 18 is winding, or being prevented from unwinding.

Figure 10:
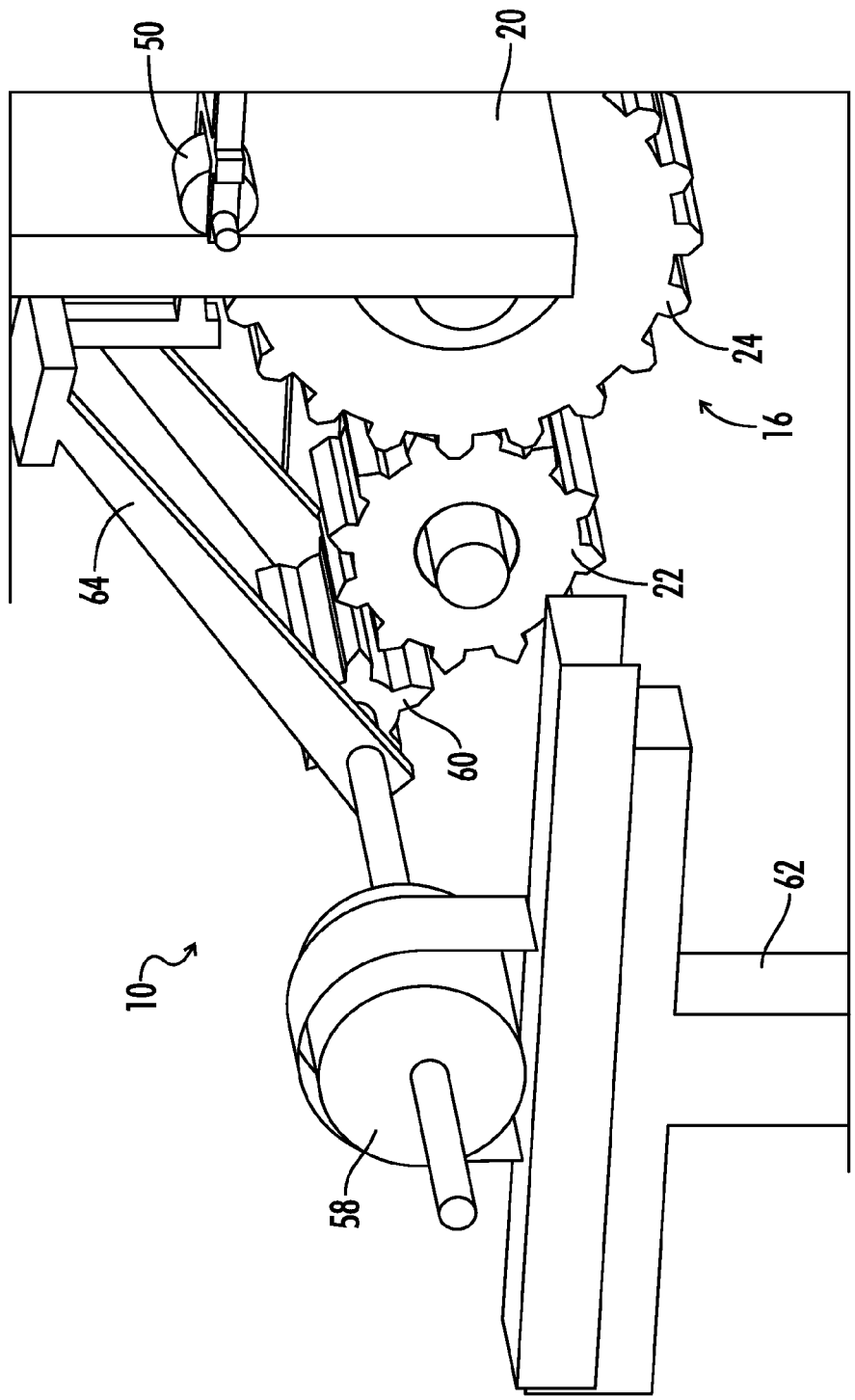
FIG. 10 is a detailed perspective view of the generator from the energy production apparatus of FIG. 1 when the locking member is in a disengaged position with the gear system.

The generator 58 and the generator 60 are shown in FIG. 10 when the lever 64 disengages the locking member 38. The lever 64 can pull the generator 58 and generator gear 60 along the support tower 62 such that the generator gear 60 engages the secondary gear 22 on the drive shaft 14. As such, when the torsion spring 18 is allowed to unwind and the drive shaft 14 rotates, the generator 58 is powered by the corresponding secondary gear 22 and generator gear 60.

In some embodiments, the gear ratio between the secondary gear 22 and the generator gear 60 can be at least two to one. As such, the generator 58 proceeds through more revolutions than the drive shaft, which can increase the efficiency and power output of the generator 58. In some embodiments, the gear ratio between the secondary gear 22 and the generator gear 60 can be at least three to one.

Figure 11:
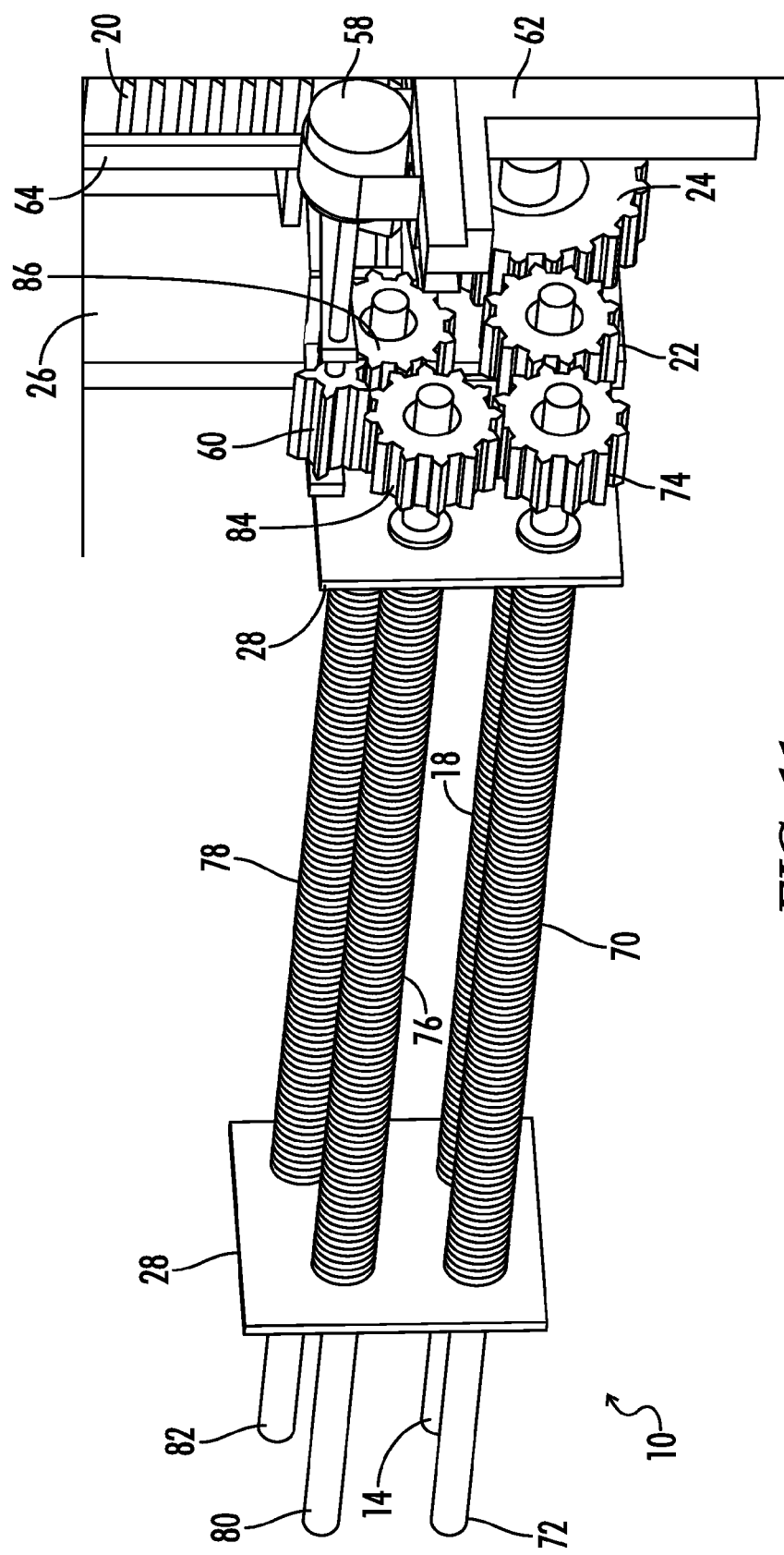
FIG. 11 is a perspective view of a second embodiment of an energy production apparatus of the present invention having multiple drive shafts and multiple torsion springs.

In some embodiments, as shown in FIG. 11, the energy production apparatus 10 can include at least a second torsion spring 70. When the weight bearing member 12 moves to the lower position and the gear system 16 rotates, both torsion springs can be wound which can ultimately increase the amount of stored potential energy that can later be used to produce mechanical power or electrical power via the generator 58. In some embodiments the second torsion spring 70 is also connected to the drive shaft 14 similarly to the torsion spring 18 as previously described.

In other embodiments, as shown in FIG. 11, the energy production apparatus 10 can include a second drive shaft 72. The second drive shaft 72 can include a joinder gear 74. The joinder gear 74 can be meshed with the secondary gear 22 such that the drive shaft 18 and the second drive shaft 72 are coupled together. As such, when the gear system 16 rotates as the weight bearing member 12 moves to the lower position, the secondary gear 22 rotates the drive shaft 14 winding the torsion spring 18, and the secondary gear 22 rotates the joinder gear 74 which in turn rotates the second drive shaft 72 and winds the second torsion spring 70. When the lever 64 disengages the locking member 38 from the gear system 16, the torsion spring 18 unwinds as previously described, and as the second torsion spring 70 unwinds, the torque produced by the second torsion spring 70 is transferred to the drive shaft 14 through the joinder gear 74. As such the generator 58 can be coupled to only one of the drive shafts while still being powered by both torsion springs 18 and 70. As such, the energy production apparatus 10 can produce double the amount of energy as two springs are being wound as opposed to one off of the same load 34 placed on the weight bearing member 12.

This concept can be expanded and multiple torsion springs and drive shafts can be added such that a bank of torsion springs can be produced. For instance, in FIG. 11, the energy production system further includes a third and fourth torsion springs 76 and 78, which can be connected to third drive shaft 80 and fourth drive shaft 82 respectively. The third drive shaft 80 can be coupled to the remaining drive shafts via second joinder gear 84, and the fourth drive shaft can be coupled with the remaining drive shafts via third joinder gear 74. Additional torsion springs can be similarly added to continually increase the amount of energy that can be produced using the same load 34.

As can be seen in FIG. 11, any two adjacent joinder gears or adjacent joinder and secondary gears will rotate in opposite directions as the gear system operates. As such, the generator gear 60 connected to the lever 64 can be configured such that the generator gear 60 meshes with one joinder gear as the torsions springs wind, and the generator gear 60 can mesh with an adjacent joinder gear as the locking member is disengaged from the gear system, the torsion springs unwind, and the gear system rotates in the reverse direction. As such, the generator gear 60 and the generator can be configured to rotate in the same direction during both the winding and unwinding of the torsion springs. In FIG. 11, the generator gear is meshed with the second joinder gear 84 as the torsion springs are winding. When the lever 64 is activated, and the gears rotate in the reverse direction, the lever forces the generator 58 and the generator gear 60 to slide along the support tower 62 and engage the third joinder gear 86. As such, power can be produced by the generator during the winding and unwinding of the torsion springs. This can increase the amount of energy that can be produced by the energy production apparatus 10.

Referring again to FIG. 1, the energy production apparatus can further include a speed regulator connected to the drive shaft 14. The speed regulator can control the speed at which the drive shaft 14 rotates as the torsion spring 18 unwinds. Consequently, the torsion springs can unwind at a generally constant speed and constant torque until all of the potential energy in the torsion spring 18 is converted to mechanical or electrical energy. As such, when additional loads are placed on the system that can further wind the torsion spring 18 and increase the potential energy stored in the torsion spring 18, the apparatus 10 can then produce a desired amount of energy for a longer amount of time when the torsion spring 18 is allowed to unwind. On embodiments that include multiple drive shafts, the speed regulator 88 can be coupled with any of the drive shafts. Since the drive shafts are all coupled together with joinder gears, a speed regulator 88 on any one of the drive shafts will effectively regulate the speed of all the drive shafts.

The gear system 16 and the drive shaft 14 in the embodiments previously described have been located at a position generally below the weight bearing member 12. However, in some embodiments the gear system 16 and the drive shaft 14 can be suspended such that they are at a location above the weight bearing member. Such a system can function in a similar manner as the embodiments previously described.

Thus, although there have been described particular embodiments of the present invention of a new and useful Static Weight Energy Production Apparatus it is not intended that such references be construed as limitations upon the scope of this invention except as set forth in the following claims.

What is claimed is:

1. A energy production apparatus comprising:
a weight bearing member configured to alternate between an upper position and a lower position;
a drive shaft;
a gear system connected to the weight bearing member and the drive shaft, the gear system positioned to rotate the drive shaft when a load is placed on the weight bearing member and the weight bearing member moves from the upper position to the lower position;
a torsion spring connected to the drive shaft, the torsion spring positioned to wind as the weight bearing member moves to the lower position;
a return member configured to return the weight bearing member to the upper position when the load is removed from the weight bearing member; and
a locking member selectively engaging the gear system, the locking member preventing the torsion spring from unwinding when the locking member is engaged.

2. The apparatus of claim 1, wherein the weight bearing member is a ramp, the ramp having an inclined orientation when the ramp is in the upper position, the ramp rotating to a substantially flat orientation when the ramp is in the lower position.

3. The apparatus of claim 1, wherein the locking member further comprises a ratchet system which biases the locking member to engage the gear system, the locking member when engaged allowing the gear system to rotate the drive shaft and wind the torsion spring as the weight bearing member moves to the lower position.

4. The apparatus of claim 1, further comprising a lever selectively disengaging the locking member from the gear system.

5. The apparatus of claim 1, further comprising a fixed support member, the drive shaft rotating freely on the fixed support member, wherein the torsion spring has a first end and a second end, the first end connected to the fixed support member, the second end connected to the drive shaft, such that the torsion spring winds when the drive shaft rotates.

6. The apparatus of claim 1, wherein the gear system further comprises a linear gear connected to the weight bearing member, and the drive shaft further comprises a secondary gear, the secondary gear driven by the linear gear as the weight bearing member moves to the lower position.

7. The apparatus of claim 6, wherein the gear system further comprises an idler gear meshed with the linear gear and the secondary gear, the linear gear rotating the secondary gear via the idler gear.

8. The apparatus of claim 7, wherein the gear ratio between the idler gear and the secondary gear is at least 2 to 1.

9. The apparatus of claim 1, wherein the gear system further comprises a linear gear hingedly connected to the weight bearing member and a second gear positioned to rotate the drive shaft, the linear gear having a plurality of teeth oriented at a downward angle such that the teeth engage the second gear as the weight bearing member moves to the lower position, and the teeth pivot the linear gear away from the second gear as the weight bearing member returns to the upper position.

10. The apparatus of claim 1, further comprising a generator coupled to the drive shaft.

11. The apparatus of claim 10, further comprising a secondary gear on the drive shaft and a generator gear connected to the generator, the secondary gear meshed with the generator gear such that the generator is coupled to the drive shaft via the secondary and generator gears.

12. The apparatus of claim 11, wherein the generator gear is configured to selectively engage the secondary gear.

13. The apparatus of claim 11, wherein the gear ratio between the secondary gear and the generator gear is at least 2 to 1.

14. The apparatus of claim 1, wherein the return member is a return spring.

15. The apparatus of claim 1, further comprising a second drive shaft, a joinder gear system coupling the drive shaft and the second drive shaft, and a second torsion spring connected to the second drive shaft, the gear system and joinder system rotating the first and second drive shafts and winding the first and second torsion springs as the weight bearing member moves to the lower position, the locking member when engaged preventing the first and second torsion springs from unwinding.

16. The apparatus of claim 1, further comprising a speed regulator coupled to the drive shaft, the speed regulator controlling the rotational speed of the drive shaft as the torsion spring unwinds.

17. An energy production apparatus comprising:
- a weight bearing member configured to alternate between an upper position and a lower position;
- a drive shaft;
- a gear system connected to the weight bearing member and the drive shaft, the gear system positioned to rotate the drive shaft when a load is placed on the weight bearing member and the weight bearing member moves from the upper position to the lower position;
- a torsion spring connected to the drive shaft, the torsion spring positioned to wind as the weight bearing member moves to the lower position;
- a return member configured to return the weight bearing member to the upper position when the load is removed from the weight bearing member; and
- a locking pawl and ratchet system biased such that it engages the gear system, wherein the locking pawl and ratchet system when engaged allows the gear system to rotate such that the drive shaft rotates and winds the torsion spring, and the locking pawl and ratchet system when engaged prevents the torsion spring from unwinding.

18. The apparatus of claim 17, further comprising a lever selectively disengaging the locking pawl and ratchet system from the gear system.

19. An energy production apparatus comprising:
- a weight bearing member configured to alternate between an upper position and a lower position;
- a drive shaft;
- a gear system connected to the weight bearing member and the drive shaft, the gear system positioned to rotate the drive shaft when a load is placed on the weight bearing member and the weight bearing member moves from the upper position to the lower position;
- a torsion spring disposed on the drive shaft, the torsion spring positioned to wind as the weight bearing member moves to the lower position;
- a return member configured to return the weight bearing member to the upper position when the load is removed from the weight bearing member;
- a generator coupled to the drive shaft, the generator driven by the shaft as the torsion spring unwinds; and
- a locking member selectively engaging the drive shaft, the locking member when engaged preventing the torsion spring from unwinding.

\* \* \* \* \*